March 21, 1950 R. C. SCHULTE 2,501,193
COMBINED WARMER AND STERILIZER
FOR BOTTLES AND THE LIKE
Filed July 2, 1945
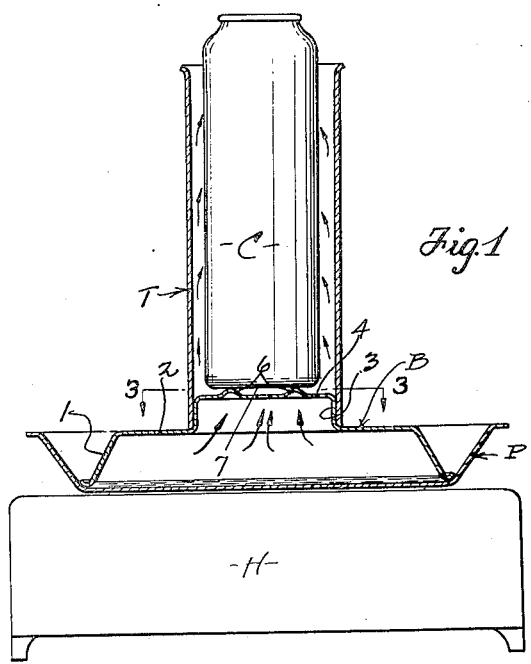
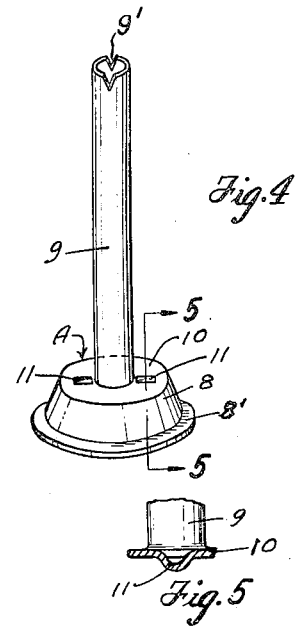
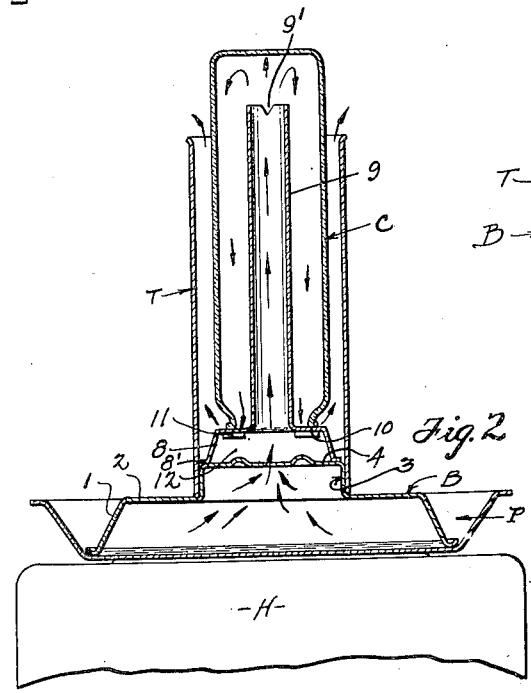
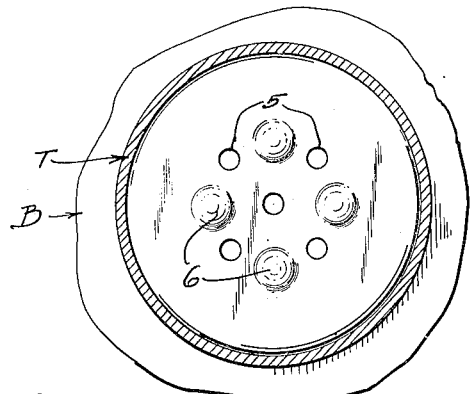
INVENTOR.
RICHARD C. SCHULTE
BY
Attorney Patented Mar. 21, 1950

2,501,193

UNITED STATES PATENT OFFICE 2,501,193

COMBINED WARMER AND STERILIZER FOR BOTTLES AND THE LIKE

Richard C. Schulte, Los Angeles, Calif.

Application July 2, 1945, Serial No. 602,901

2 Claims. (Cl. 21—79)

1

This invention relates to and has for an object the provision of a simple, economical and efficient apparatus capable for selective use as a warmer or sterilizer for bottles, test tubes, or containers of other character, but particularly arranged for warming and sterilizing nursing bottles.

It is well known that at feeding times for infants, especially during the night hours, much inconvenience to a parent or nurse is occasioned by the preparation of warm milk due to the usual absence in a bed room or nursery of adequate facilities, and it is an object of my invention to provide an apparatus which may be used in a bed room or nursery which with but slight inconvenience and in a minimum of time may be used for first sterilizing a bottle or container and then for warming the contents, and which is sanitary and composed of readily separable parts.

Briefly, an apparatus embodying my improvements includes an inverted pan-like base adapted to be placed in a pan or receptacle in which there is a shallow volume of water and which, when the pan is placed upon a heater, either electric or gas, will quickly heat the water to a boiling point so that steam as a sterilizing agent may be as quickly developed as possible. A steam chest or dome is preferably provided at the top of the base upon which a nursing bottle may be placed in either normal or inverted position so that steam may be employed for sterilizing the interior and exterior of the bottle when it is in inverted position, or for warming the contents when it is in normal position.

An object is to provide a tubular housing member detachably applicable to the base and of slightly larger diameter than the bottle or container which will serve to confine the rising steam to the area immediately surrounding and within the bottle when the bottle is inverted and which will warm the contents of the bottle by radiation and convection when normally positioned in the housing.

A further object is to provide a special form of adaptor which is insertible in the housing for effecting a sterilizing operation and is detached therefrom for a warming operation, thereby eliminating the necessity for different devices for the two purposes.

Still other objects may appear as the description of my apparatus progresses.

I have shown a preferred form of apparatus in the accompanying drawing, subject to modification, within the scope of the appended claims,

2 without departing from the spirit of the invention.

In said drawing:

Fig. 1 is a sectional elevation of an apparatus embodying my improvements as seen on a diametrical line, and showing a bottle held in position as during a warming operation;

Fig. 2 is a view similar to Fig. 1, showing a bottle held in position in the apparatus as during a sterilizing operation;

Fig. 3 is a sectional plan on line 3—3 of Fig. 1;

Fig. 4 is a perspective view of an adaptor which is suitable for converting the warmer to a sterilizer; and Fig. 5 is a fragmentary section on line 5—5 of Fig. 4.

In a preferred form my apparatus includes a base B of inverted pan-like cross section forming a steam generator and adapted to be supported in a receptacle P, a suitable heater H for supporting the pan P, a tubular housing T supported on base B for enclosing a container C, and an adaptor A arranged to seat upon the base B during a sterilizing operation and to support the inverted container C.

Base B is formed with a frusto-conical wall 1, a top 2 and a central dome 3 having a top 4 which is elevated above the level of top 2 and is formed with a plurality of perforations 5 and a plurality of bosses 6. The perforations 5 serve to exhaust the steam from the dome 3 into housing T during a warming operation as shown in Fig. 1 and into the housing T and container C during a sterilizing operation. The bosses 6 hold the bottom 7 above the level of top 4 of the dome in order that steam may freely flow from the bottom of and upwardly around the container C in a warming operation.

As shown in Fig. 4 the adaptor A is formed with an inverted pan-like base 8 with an upright tube 9 which is encompassed by container C when it is inverted as shown in Fig. 2. The base 8 may have a flange 8' at its bottom, and a flat top 10 formed with one or more radially or otherwise disposed grooves 11 so that when container C is inverted and supported on top 10, as shown in Fig. 2, steam from dome 3 may freely exhaust into a chamber 12 of the adaptor base and thence pass upwardly into tube 9 into the container and also through grooves 11 into housing T around the periphery of container C. Thus, the steam entering tube 9 through the central perforation 5 will rise to a point approaching the closed end of container C (bottom 7 because the container is then inverted) and will thence flow downwardly in the container, through the grooves 11 and finally upwardly in housing T, thereby serving to thoroughly sterilize the interior and exterior of the container. Two or more notches $9^1$ made in the upper end portion of the tube 9 provide additional exits for the steam should the bottom 7 of the container be disposed in close proximity to or against the end of the tube while the container is in its inverted position to be sterilized.

It is, therefore, only necessary to convert the apparatus from a warmer to a sterilizer, or vice versa, by inserting or removing the adaptor A from housing T and changing the position of the container accordingly. The housing T in either case is vented of exhaust steam at its upper end as indicated by the arrows in Figs. 1 and 2.

The quantity of water placed in the flash boiler P is merely sufficient to generate enough steam to first sterilize and then heat the bottle and its contents to a requisite temperature which is normally that of the human body, or if the bottles have been previously sterilized and filled only enough to quickly heat the contents to a desired temperature.

The essence of the invention, therefore, is to provide a simple, compact and efficient apparatus for the purpose described, which includes a heater, a steam generator superposed thereon, a housing on said base adapted to encompass a container in reversed positions, and an adaptor insertible in the housing between the generator and the container which is effective for sterilizing the container when it is inverted from normal position.

Certain of the advantages of my invention will appear from a reading of the foregoing portion of the description. Other advantages arise from the provision of the grooves 11 and their positioning to come under the rim element of the container mouth. Some of the steam in the hollow base 8 will pass therefrom to the space between the container C and the housing T through these grooves and in so doing will have a Venturi-like action on the steam inside the container and thus expedite its movement out of the container thereby making for increased efficiency of the device. Other advantages arise from the provision of the notches $9^1$ in the tube 9. This construction permits the device to be used for sterilizing bottles as short as the length of the tube 9 in addition to longer bottles.

I claim:

1. A device for treating bottles comprising a receptacle with a circular central dome-like structure perforated at the top and having projections adapted to receive a bottle, a circular wall, and an imperforate tubular housing extending vertically from said wall.

2. A device for treating bottles comprising a receptacle with a circular central dome-like structure perforated at the top and having projections adapted to receive a bottle, a circular wall, an imperforate tubular housing extending vertically from said wall, and a second circular dome within said housing supported on said first dome, said second dome having a vertically extending imperforate tubular extension.

RICHARD C. SCHULTE.

REFERENCES CITED

The following references are of record in the file of this patent:

UNITED STATES PATENTS

| Number | Name | Date |
| --- | --- | --- |
| 581,148 | Castle | Apr. 20, 1897 |
| 802,601 | Scanlan | Oct. 24, 1904 |
| 1,301,286 | Little et al. | Apr. 22, 1919 |
| 2,340,206 | Richards | Jan. 25, 1944 |

FOREIGN PATENTS

| Number | Country | Date |
| --- | --- | --- |
| 389,994 | Great Britain | Mar. 30, 1933 |